US007235208B2

(12) United States Patent
Moro

(10) Patent No.: US 7,235,208 B2
(45) Date of Patent: Jun. 26, 2007

(54) DUST CORE

(75) Inventor: Hideharu Moro, Tokyo (JP)

(73) Assignee: Okuyama International Patent Office, Tokyo (JP)

( * ) Notice: Subject to any disclaimer, the term of this patent is extended or adjusted under 35 U.S.C. 154(b) by 139 days.

(21) Appl. No.: 11/043,397

(22) Filed: Jan. 26, 2005

(65) Prior Publication Data

US 2005/0203234 A1 Sep. 15, 2005

Related U.S. Application Data

(60) Division of application No. 10/412,174, filed on Apr. 11, 2003, now Pat. No. 6,940,388, which is a continuation of application No. 09/867,886, filed on May 30, 2001, now abandoned.

(30) Foreign Application Priority Data

Sep. 8, 2000 (JP) ............................ 2000-273082

(51) Int. Cl.
*B29B 7/82* (2006.01)

(52) U.S. Cl. .......................... 264/328.14; 264/328.17; 264/331.11; 29/603.07; 336/233; 148/104

(58) Field of Classification Search ........... 264/328.14, 264/328.17, 331.11; 29/603.07; 336/233; 148/104
See application file for complete search history.

(56) References Cited

U.S. PATENT DOCUMENTS

| | | | | |
|---|---|---|---|---|
| 4,601,765 | A * | 7/1986 | Soileau et al. | 148/104 |
| 6,102,980 | A * | 8/2000 | Endo et al. | 75/252 |
| 6,149,704 | A * | 11/2000 | Moro et al. | 75/230 |
| 6,527,823 | B2 * | 3/2003 | Moro | 75/246 |
| 6,904,388 | B2 * | 6/2005 | Grieb et al. | 702/185 |

FOREIGN PATENT DOCUMENTS

EP 869 517 * 10/1998

* cited by examiner

*Primary Examiner*—Margaret G. Moore
(74) *Attorney, Agent, or Firm*—Olson & Hierl, Ltd.

(57) ABSTRACT

A dust core consists essentially of ferromagnetic powder; and an insulating binder, in which the ferromagnetic powder is dispersed; wherein the insulating binder is a silicone resin comprising a trifunctional alkyl-phenyl silicone resin and optionally containing an inorganic insulator such as an inorganic oxide, carbide or nitride. Preferably the alkyl-phenyl silicone resin is a methyl-phenyl silicone resin and comprises about 20 to 70 mol % of trifunctional groups. The dust core can be produced by pressure-molding a ferromagnetic powder, a lubricant and a trifunctional alkyl-phenyl silicone resin binder and heat treating the molded core at a temperature in the range of about 300 to about 800° C. for a time period in the range of about 20 minutes to about 2 hours in a non-oxidizing atmosphere. The dust core has high magnetic permeability representing the direct current superimposition characteristics, has reduced core loss and has increased mechanical strength.

5 Claims, 2 Drawing Sheets

(a)

(b)

(c)

(d)

DUST CORE

CROSS-REFERENCE TO RELATED APPLICATIONS

This application is a division of U.S. Application for U.S. Pat. No. 10/412,174, filed Apr. 11, 2003 and entitled DUST CORE, now U.S. Pat. No. 6,940,388, which is a continuation of U.S. Application for U.S. Pat. No. 09/867,886, filed on May 30, 2001, now abandoned.

BACKGROUND OF THE INVENTION

1. Field of the Invention

The present invention relates to a dust core used for a magnetic core of a transformer or an inductor, a magnetic core for a motor or other electronic parts.

2. Prior Art

In recent years, progress in miniaturizing electric or electronic tools has been made. Along with such a progress, there is a demand for small-sized and highly efficient dust cores. As a ferromagnetic powder for a dust core powder, a ferrite powder or a ferromagnetic metal powder is used. Because the ferromagnetic metal powder has a large saturation magnetic flux density in contrast to the ferrite powder, it has the advantage that the magnetic core can be small-sized. However, the ferromagnetic metal powder has a low electric resistance. Thus, it has the drawback that the eddy-current loss is increased. A dielectric film is formed on the surface of a ferromagnetic metal powder with an insulating material such as a resin or an inorganic material to decrease the eddy-current loss as much as possible.

Other than the above, the characteristics required to miniaturize a magnetic core include not only a large saturation magnetic flux density but also a high magnetic permeability (effective magnetic permeability in an applied field) in a high magnetic field of superimposed direct current to alternating current. Excellent direct current superimposition characteristics enables the miniaturization of the magnetic core. This reason is as follows. The strength of an operating magnetic field is obtained by dividing a current by the length of a magnetic path. Therefore, when the magnetic core is small-sized whereby the length of a magnetic path is shortened, the operating magnetic field is transferred to the high magnetic field side. Even if the operating magnetic field is transferred to the high magnetic field side, a high inductance is obtained, enabling miniaturization, if the magnetic permeability when direct current is superimposed is high.

Also, other than the above, an inductor corresponding to a large current is required. In this case, also, even if the current is increased and the operating magnetic field is transferred to the high magnetic field side, this can be dealt with when the magnetic core has a high magnetic permeability in a high magnetic field. Further, if the magnetic core has a high magnetic permeability in a high magnetic field and is free from a sudden reduction in magnetic permeability, the number of windings in, for example, an inductor can be increased. Because the inductance of an inductor is proportional to the square of the number of windings, the magnetic core can be smaller.

On the other hand, even if the magnetic core has a high magnetic permeability in a high magnetic field, core loss comes to be important along with the progress in the miniaturization of the magnetic core. Conventionally, when a ferromagnetic metal powder is molded to prepare a dust core, it is heat-treated at high temperatures to improve the magnetic characteristics such as core loss, thereby releasing the strain caused by molding to decrease the coercive force of the dust core to thereby improve the direct current superimposition characteristics. Also, hysteresis loss is decreased and in addition, core loss can be decreased.

However, high temperature heat treatment like this causes a resin in an insulating material to decompose rendering its amount reduced thereby decreasing electric insulation between ferromagnetic metal powders. This causes the eddy-current loss to be increased and hence the core loss is increased.

In view of the above situation, the following proposals have been offered to prevent the core loss from increasing. For instance, dust cores and the like using a silicone resin as an insulating material are disclosed in each of the publications of JP-A-2000-49008, JP-A-2000-30925, JP-A-2000-30924, JP-A-11(1999)-260618, JP-A-8(1996)-236333, JP-A-7(1995)-211532, JP-A-7(1995)-21153 and JP-A-6 (1994)-342714. Also, a dust core and the like which use a silicone resin and an organic titanate as an insulating material are disclosed in the publications of JP-A-8(1996)-45724 and JP-A-7(1995)-254522.

However, the silicone resin used in such a dust core and the like described in the publication of JP-A-2000-49008 as aforementioned poses the problem that if the heat-treating temperature is raised, the silicone resin is heat-decomposed rendering its amount reduced thereby decreasing electric insulation between ferromagnetic metal particles, which causes the eddy-current loss to be increased and hence the core loss is increased.

Further, the reduction in the amount of the silicone resin as a result of the heat-decomposition of the silicone resin likewise poses the problem of reduced mechanical strength because of a reduction in the amount of the binder between ferromagnetic powder.

Therefore, it is an object of the present invention to provide a dust core which has a high magnetic permeability representing the direct current superimposition characteristics, which has reduced core loss and which has increased mechanical strength even if it is heat-treated at high temperatures, the dust core being obtained by pressure-molding at least a ferromagnetic powder and an insulating material.

SUMMARY OF THE INVENTION

The above object can be attained by a dust core comprising: ferromagnetic powder and an insulating binder, in which said powder is dispersed, wherein the insulating binder is a silicone resin comprising phenyl groups.

In the invention, the silicone resin is an alkyl-phenyl silicone resin. In the invention, the alkyl-phenyl silicone resin is a methyl-phenyl silicone resin. In the invention, the methyl-phenyl silicone resin has a phenyl content in the range from 15 mol % to 60 mol %, based on the total moles of methyl-phenyl silicone resin. In the invention, the amount of the silicone resin is in a range from 0.3 to 5% by weight, based on the weight of ferromagnetic particles. In the invention, the silicone resin is an alkyl-phenyl silicone resin. In the invention, the alkyl-phenyl resin is a methyl-phenyl resin. In the invention, the methyl-phenyl silicone resin has a phenyl content in the range from 15 mol % to 60 mol %, based on the total moles of methyl-phenyl silicone resin. In the invention, a dust core comprising: ferromagnetic powder and an alkyl-phenyl silicone insulating binder, in which said powder is dispersed, wherein the alkyl-phenyl silicone resin comprises from 20 mol % to 70 mol % of a trifunctional methyl-phenyl silicone resin, based on the total moles of alkyl-phenyl silicone resin.

As mentioned above, the dust core of the present invention has high magnetic permeability and possesses excellent magnetic characteristics represented by a small core loss and excellent mechanical characteristics represented by a high radial crushing strength.

DESCRIPTION OF THE PREFERRED EMBODIMENT

Figure 1:
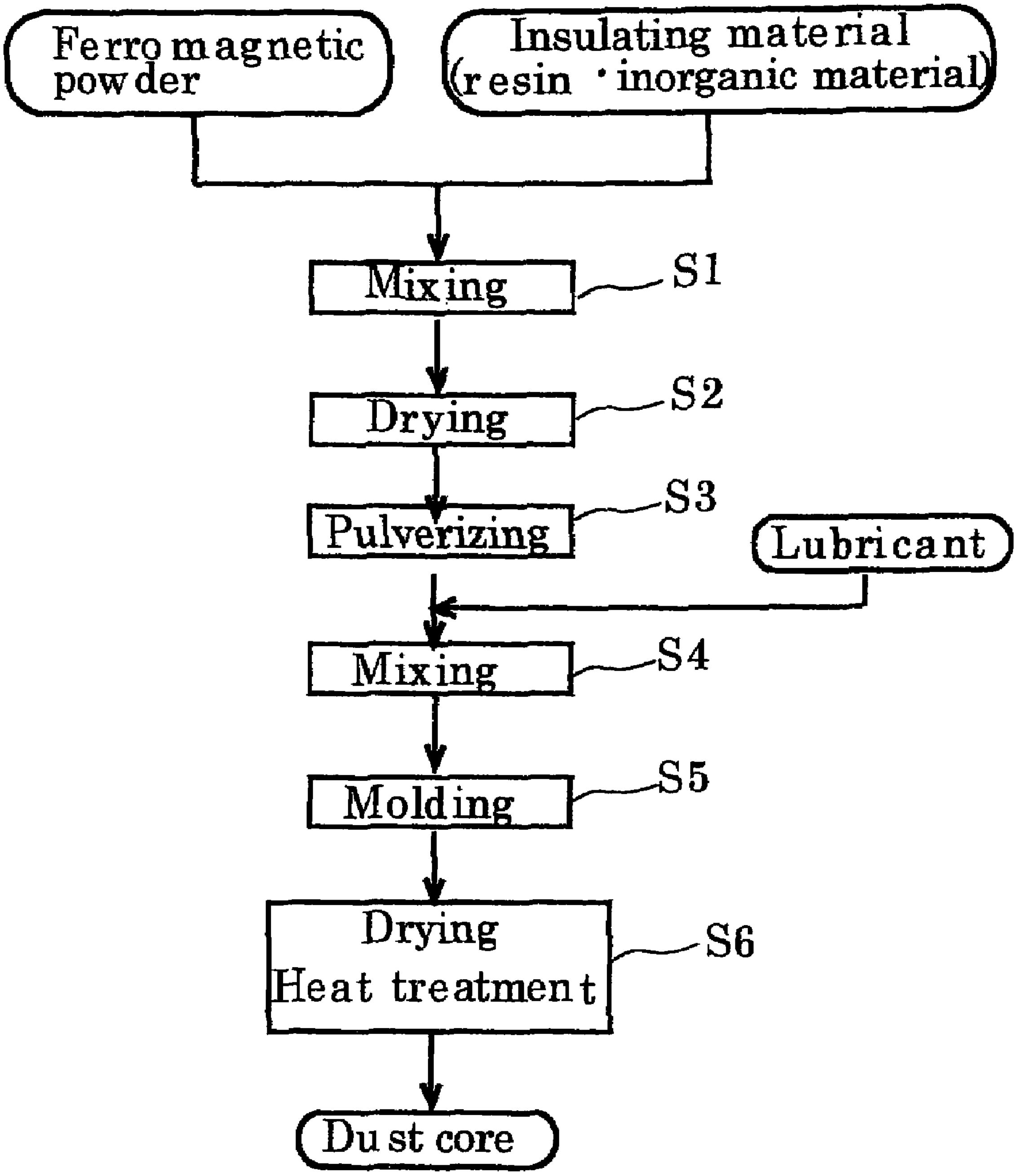
FIG. 1 is a view showing a process for producing a dust core according to the present invention.

An embodiment of the present invention will be hereinafter described in detail. FIG. 1 is a view of a step of producing the dust core of the present invention.

The present invention comprises a ferromagnetic powder as shown in FIG. 1. Although no particular limitation is imposed on the ferromagnetic powder, at least one type selected from the group consisting of soft magnetic materials such as Fe, Fe—Ni—Mo (Supermalloy), Fe—Ni (Permalloy), Fe—Si—Al (Sendust), Fe—Co, Fe—Si and Fe—P may be used. The average particle diameter of the ferromagnetic metal powder is 5 to 150 μm and preferably 10 to 100 μm. When the average particle diameter is 5 μm or less, the coercive force is larger whereas when the average particle diameter is 150 μm or more, a large eddy-current loss results. The shape of the ferromagnetic metal powder, without any particular limitation, may be spherical or flat. For instance, among toroidal magnetic cores, E-type magnetic cores and the like, those in which the conductive winding has a rectangular parallelepiped pin can be produced by transverse molding, specifically, by applying pressure in a direction perpendicular to the direction of the magnetic path during use. In transverse molding, because the principal plane of a flat particle can be made parallel to the magnetic path in the dust core, the magnetic permeability can be improved by using the flat particle. As the flattening means, a means having rolling and shearing actions such as a ball mill, rod mill, vibration mill and attrition mill is properly selected upon use. The ratio of flattening is, though not particularly limited to, preferably about 5 to 25 in terms of aspect ratio. Also, the surface of the ferromagnetic metal powder is preferably smooth. If the surface of the ferromagnetic metal powder is smooth when pressure is applied to carry out molding, the filling rate can be increased. On the contrary, if the surface is uneven, stress is concentrated upon the convex parts, allowing a strain to be easily caused, thereby lowering the magnetic characteristics such as magnetic permeability. Also, that parts receive pressure to allow the ferromagnetic metal powder to be in contact with each other, leading to dielectric breakdown which increases eddy-current loss.

Further, the present invention uses a methyl-phenyl silicone resin containing both of a methyl group and a phenyl group as the insulating material. As a resin for the insulating material, a styrene resin, acrylic resin, styrene/acrylic resin, ester resin, urethane resin, olefin resin such as a polyethylene resin, phenol resin, carbonate resin, ketone resin, fluoro resin such as a fluoromethacrylate and vinylidene fluoride, silicone resin or phenol resin or modified product of each of these resins is used. All of these resins are heat-decomposed and deteriorated in the insulation at higher heat-treating temperatures, bringing about a large eddy-current loss which causes a large core loss. Further, the heat decomposition leads to a reduction in amount and therefore the mechanical strength is decreased.

Silicone resins are resins that comprise a main skeleton using a siloxane bond as its structural unit. The structure of the silicone resin due to functional groups such as an alkyl group and/or a phenyl group to be introduced into the side chain thereof greatly affects the magnetic characteristics and mechanical strength of a dust core. A silicone resin having a phenyl group is enough, particularly, a silicone resin having an alkyl group and a phenyl group ensures strong water-repellency, high stability to environmental changes and also high electrical insulation and such a silicone resin is suitable to an insulating resin for a dust core having excellent magnetic characteristics. The alkyl group such as the ethyl group, the methyl group, the propyl group and so on may be used, preferable the methyl group may be used. Particularly, the possession of both of a methyl and a phenyl group ensures strong water-repellency, high stability to environmental changes and also high electrical insulation and such a silicone resin is suitable for an insulating resin for a dust core having excellent magnetic characteristics.

Also, when a phenyl group is introduced into a silicone resin having a methyl group, the heat stability is further improved because the silicone resin becomes resistant to a dehydrogenation reaction with oxygen. Therefore, a strain of the ferromagnetic metal powder which strain is caused by high temperature heat treatment during molding is released and the coercive force of the dust core is decreased, resulting in excellent direct current superimposition characteristics. Also, because the insulation is deteriorated with difficulty, the core loss is decreased.

When a silicone resin other than a conventional methyl-phenyl silicone resin is used, the silicone resin is decomposed by high temperature heat treatment, allowing the ferromagnetic metal powder to be in contact with each other, leading to the dielectric breakdown of the dust core, which increases eddy-current loss.

Figure 2:
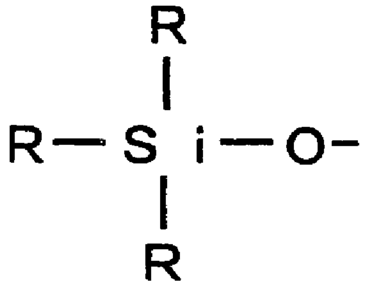
FIG. 2 is a view showing a molecular structure of a silicone resin.
Figure 2:
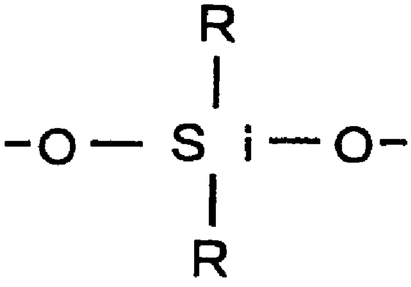
Figure 2:
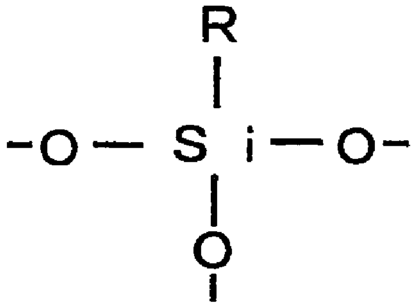
Figure 2:
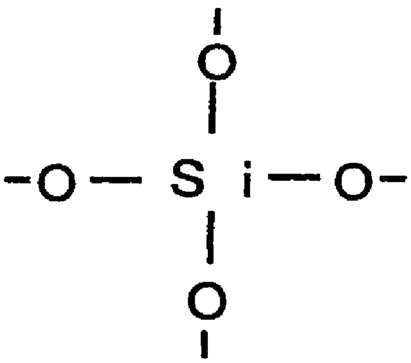

Moreover, the amount of a trifunctionality contained in the methyl-phenyl silicone resin is preferably in a range from 20 to 70 mol % based on the total silicone resin. FIG. 2 is a view showing the structural unit of a principal chain of a silicone resin. The structural unit of a silicone resin is, as shown in FIG. 2, classified into four types, namely, a monofunctionality shown by (a) in FIG. 2, a difunctionality shown by (b) in FIG. 2, a trifunctionality shown by (c) in FIG. 2 and a quaterfunctionality shown by (d) in FIG. 2. A methyl-phenyl silicone resin crosslinks during curing by heat treatment to form a network with an increase in functionality. Conventionally, for example, a netting additive such as organic titanate is added to form a network. However, in the case of a trifunctional methyl-phenyl silicone resin, it can form a network independently. For this, a methyl-phenyl silicone resin having high functionality is advantageous; however, the quaterfunctionality has high reactivity and is therefore unstable, specifically, the reaction is excessively fast, making a film of the methyl-phenyl silicone resin very hard.

As to the characteristics of the methyl-phenyl silicone resin in heat treatment, the methyl-phenyl silicone resin has the characteristics that if the amount of the trifunctionality is increased, the drying speed of the methyl-phenyl silicone resin in heat treatment is increased and a film of the methyl-phenyl silicone resin is hardened, whereas if the amount of the difunctionality or monofunctionality is increased, the drying speed of the methyl-phenyl silicone resin in heat treatment is decreased and the film of the methyl-phenyl silicone resin is less hardened but improved in heat stability. For this, the amount of the trifunctionality is preferably in a range from 20 to 70 mol % in view of mechanical strength and heat stability. When the amount of the trifunctionality is 20 mol % or less, the heat stability is improved but the drying speed of the methyl-phenyl silicone resin in heat treatment is decreased and a film of the methyl-phenyl silicone resin is less hardened. When the amount of the trifunctionality is 70 mol % or more, the drying speed of the methyl-phenyl silicone resin in heat treatment is increased and a film of the methyl-phenyl silicone resin is hardened but becomes brittle in this case the film of the resin can be broken during heat treatment.

The amount of methyl-phenyl silicone resin to be added is in a range from 0.3 to 5.0 wt % and preferably 0.5 to 3.0 wt % based on the ferromagnetic powder. When the amount of the methyl-phenyl silicone resin to be added is 0.3 wt % or less, insulation between the ferromagnetic metal powder particles in the dust core is insufficient and therefore eddy-current loss is increased, resulting in increased core loss. When the amount of the methyl-phenyl silicone resin to be added is 5.0 wt % or more, the non-magnetic component in the dust core is increased, with the result that the magnetic permeability and the magnetic flux density are decreased and the mechanical strength of the dust core is decreased.

The amount of a phenyl group contained in the methyl-phenyl silicone resin is in a range from 15 to 60 mol %. The amount of a phenyl group is expressed by mol % based on all organic groups contained in the silicone resin. When the amount of a phenyl group is 60 mol % or more, the mechanical strength becomes excessively high by heat treatment, leading to increased brittleness with the result that cracks tend to occur and the heat stability is decreased. When the amount of a phenyl group is 15 mol % or less, the mechanical strength of the silicone resin film is decreased by heat treatment and the heat stability is also decreased. Therefore, the amount of a phenyl group is preferably in a range from 15 to 60 mol % in view of mechanical strength and heat stability.

When the insulating resin is mixed with the ferromagnetic metal powder, a solid or liquid resin may be made into a solution prior to mixing or a liquid resin may be directly mixed. The viscosity of the liquid resin is preferably 10 to 10000 mPa s and more preferably 50 to 9000 mPa s. Even if the viscosity is excessively low or high, it is hard to form a uniform film on the surface of the ferromagnetic metal powder. Also, when a solid insulating resin is mixed, the insulating resin may be crushed into fine particles by a crusher prior to mixing. These crushed fine particles betters miscibility with the ferromagnetic metal powder and therefore, a thin film of the insulating resin can be formed on the surface of the ferromagnetic metal resin.

Also, in the present invention, an inorganic insulating material may be combined with the silicone resin as the insulating material as shown in FIG. 1. Examples of materials which may be used as the inorganic insulating material are inorganic insulating materials including inorganic oxides such as silicon oxide (silica ($SiO_2$)), aluminum oxide (alumina ($Al_2O_3$)), titanium oxide (titania ($TiO_2$)) and zirconium oxide (zirconia ($ZrO_2$)), inorganic carbides such as aluminum carbide (AlC) and titanium carbide (TiC) and inorganic nitrides such as aluminum nitride (AlN) and titanium nitride (TiN) and those obtained by treating the surface of each of these compounds by using a surface modifier, a resin or the like. Inorganic insulating materials which are made hydrophobic by treating the surface using organic titanate as the surface modifier are more preferred.

Those obtained by uniformly dispersing each of these inorganic insulating material in a solvent colloid-like may be used. As the solvent, water and nonaqueous types are exemplified. Among them, nonaqueous solvents are preferable in view of compatibility with the insulating resin. Among these nonaqueous solvents, ethanol, butanol, toluene, benzene and xylene are preferable. The amount of the solvent to be added is preferably 0.1 to 15.0 Vol % and particularly 0.5 to 5.0 Vol % as converted into solid content based on the ferromagnetic metal powder. This is because if the amount of a solid content of silica, titania, zirconia or the like to be added is small, insulation between the ferromagnetic metal powders is insufficient, which increases eddy-current loss and core loss whereas if the amount to be added is excessive, nonmagnetic components in the dust core is increased thereby decreasing the magnetic characteristics such as magnetic permeability.

Also, the present invention may include a lubricant as shown in FIG. 1. Given as examples of the lubricant are compounds such as low molecular weight hydrocarbons, fatty acids and metal salts. Compounds such as molybdenum disulfide ($MoS_2$) are also exemplified. Particularly, fatty acid metal salts are desirable and aluminum stearate and zinc stearate are more desirable.

Next, the process for the production of the dust core according to the present invention will be explained with reference to FIG. 1. First, the ferromagnetic powder is mixed with the insulating material (S1 in FIG. 1). As the insulating material, a silicone resin which is an insulating resin and the inorganic insulating material are mixed with each other prior to use. The ferromagnetic metal powder may be heat-treated to release a strain prior to mixing. Also, an oxidizing process may be performed to form a thin oxide film which improves insulation between these ferromagnetic metal powders. As to the condition for mixing, a pressure kneader or the like is used to mix both at ambient temperature for 20 to 60 minutes. After the mixing is finished, the mixture is dried at a temperature of 80 to 200° C. for 20 to 60 minutes (S2 in FIG. 1).

After the drying is finished, the product is pulverized (S3 in FIG. 1) and the lubricant is added to and mixed with the product (S4 in FIG. 1) to obtain a powder for a dust core. Here, aluminum stearate or zinc stearate is used as the lubricant. As to the condition of mixing, even a container-rotating type such as a V-type mixer or even a container-fixed type such as a rotating disc type may be optionally selected. For example, the V-type rotating mixer may adopt such a mixing condition that the rotating speed is 30 to 80 rpm and the mixing time is 15 to 60 minutes.

Then, the resulting powder is formed into a desired shape (S5 in FIG. 1). No particular limitation is imposed on the shape of the magnetic core and a toroidal type, E-type, drum type, pot type or the like may be adopted as the shape. There is no particular limitation to the condition of molding. The pressure may be about 390 to 1960 MPa and the time required to maintain a maximum pressure may be about 0.1 to 60 seconds. These conditions may be properly determined corresponding to the type and shape of the ferromagnetic powder, the shape and size of the magnetic core to be intended and the density of the magnetic core.

After molding, the resulting product is heat-treated to release the strain produced in the ferromagnetic metal powder and caused by pressure in a mold (S6 in FIG. 1). In the heat treatment, the heat-treating conditions may be properly determined corresponding to, for example, the type and shape of the ferromagnetic powder and the condition of molding. However, the heat treatment is preferably performed at a heat-treating temperature of 300 to 800° C. for a heat-treating time of 20 minutes to 2 hours in a non-oxidizing atmosphere of inert gas, such as nitrogen gas or argon gas or of hydrogen gas.

The molded product is then subjected to the winding of conductive wires, the assembly of the magnetic core and insertion into a casing.

EXAMPLES

The dust core of the present invention is evaluated for magnetic characteristics and mechanical characteristics.

Example 1

Here, the dust core is produced in the following manner.

Table 1 shows the type and amount of silicone resin, the amount of a phenyl group of the silicone resin and the amount of the trifunctionality. It is to be noted that a methyl silicone resin is used as the insulating resin of Comparative Example 1-1 and the methyl-phenyl silicone resin of Comparative Example 1-2 is a methyl-phenyl silicone resin containing no trifunctionality but containing only the difunctionality and the monofunctionality.

TABLE 1

Resins of Examples and Comparative Examples

| Example No., Comparative Example No. | Type of insulating resin | Amount (wt %) | Amount of a phenyl group (mol %) | Amount of T* (mol %) |
|---|---|---|---|---|
| Example 1-1 | Methyl-phenyl silicone | 1.2 | 17.3 | 65.1 |
| Example 1-2 | Methyl-phenyl silicone | 1.2 | 17.2 | 56.6 |
| Example 1-3 | Methyl-phenyl silicone | 1.2 | 32.7 | 34.1 |
| Example 1-4 | Methyl-phenyl silicone | 1.2 | 58.1 | 66.5 |
| Example 1-5 | Methyl-phenyl silicone | 1.2 | 55.2 | 32.7 |
| Comparative Example 1-1 | Methyl silicone | 1.2 | 0.0 | 65.1 |
| Comparative Example 1-2 | Methyl-phenyl silicone | 1.2 | 47.2 | 0.0 |

*The amount of the trifunctionality T in all silicone resins is shown.

The silicone resin described in Table 1 is weighed and added to a Permalloy powder (trademark: DAPPB, manufactured by Daido Steel) having an average particle diameter of 28 μm. Both components are mixed and further kneaded using a pressure kneader at ambient temperature for 30 minutes. Next, the mixture is dried at 150° C. for 30 minutes in an atmosphere to obtain a ferromagnetic metal powder for a dust core.

To this ferromagnetic powder for a dust core is added 0.8 wt % of aluminum stearate (trademark: SA-1000, manufactured by Sakai Chemical Industry, content of a metal: 5 wt %) as a lubricant and these components are mixed for 15 minutes by using a V-type mixer. After the lubricant is added and mixed, the mixture is molded under a pressure of 490 MPa into a toroidal shape having an outside dimension of 17.5 mm, an inside diameter of 10.2 mm and a height of 5.0 mm.

Heat treatment after the mixture is molded is performed at 600° C. for 30 minutes in a nitrogen atmosphere.

Next, each of these Examples and Comparative Examples is evaluated for magnetic characteristics and mechanical characteristics. As the magnetic characteristics, the effective magnetic permeability μ at 100 kHz and 6000 A/m is measured using a LCR meter (HP4284A, manufactured by Yokogawa Hewlett-Packard). Further, using a B-H analyzer (SY-8232, manufactured by Iwatsu Electric), the hysteresis loss (Ph), eddy-current loss (Pe) and core loss (Pc) at 300 kHz and 25 mT are measured as the core loss.

Also, as the mechanical characteristics, the radial rupture strength up to the breakdown of the dust core having a toroidal shape is measured using a table digital load tester (manufactured by Aoki Engineering).

Table 2 shows the results of these measurements.

TABLE 2

Magnetic characteristics and mechanical characteristics of Examples and Comparative Examples

| | Magnetic characteristics | | | | Mechanical characteristics |
|---|---|---|---|---|---|
| Example No., Comparative Example No. | Effective magnetic permeability μeff | Core loss ($kW/m^3$) Pc | Ph | Pe | Radial crushing strengths (MPa) |
| Example 1—1 | 39 | 291 | 108 | 183 | 20.1 |
| Example 1-2 | 35 | 319 | 105 | 214 | 21.1 |
| Example 1-3 | 36 | 415 | 111 | 304 | 26.5 |
| Example 1-4 | 35 | 394 | 105 | 289 | 23.5 |
| Example 1-5 | 34 | 334 | 104 | 230 | 30.5 |
| Comparative Example 1—1 | 33 | 1050 | 121 | 929 | 11.8 |
| Comparative Example 1-2 | 35 | 1489 | 125 | 1364 | 12.5 |

As to the magnetic characteristics in Table 2, each of Comparative Example 1-1 using a methyl silicone resin having high thermal stability in general and Comparative Example 1-2 using a methyl-phenyl silicone resin containing no trifunctionality shows a core loss (Pc) as very high as 1050 $kW/m^3$ or more though a large difference in effective magnetic permeability is not observed between Comparative Examples and Example 1-1 or the like using the methyl-phenyl silicone resin according to the present invention. From this result, it is found that insulation between the Permalloy powders is reduced because the eddy-current loss (Pe) among the core loss is very large.

On the other hand, the radial crushing strength of each of Examples 1-1 to 1-5 is 20.1 MPa or more up to 30.5 MPa whereas the radial crushing strengths of Comparative Examples 1-1 and 1-2 are as low as 11.8 MPa and 12.5 MPa respectively.

This shows that in Comparative Examples 1-1 and 1-2, the silicone resin is decomposed and reduced in amount by heat treatment at a temperature as high as 600° C. and does not function as a binder between Permalloy powders. On the contrary, the very high radial rupture strength of each of Examples 1-1 to 1-5 shows that the resin firmly combines the Permalloy powders with each other and therefore functions as a binder, exhibiting high thermal stability.

Therefore, it is understood that a methyl silicone resin is unsuitable for the insulating material to be used in the dust core because of deficient thermal stability. Also, even in the case of using a methyl-phenyl silicone resin, a methyl-phenyl silicone resin having no trifunctionality is unsuitable for the dust core on account of deficient thermal stability.

Example 2

In Example 2 compared with Example 1, the amount of the resin is altered from 1.2 wt % to 2.4 wt %, the ferromagnetic metal powder is altered from the Permalloy powder to a Sendust powder having an average particle diameter of 40 μm and the lubricant is altered from aluminum stearate to zinc stearate to produce a dust core material. After the lubricant is added and mixed, the obtained material is molded under a pressure of 1,176 MPa into a toroidal shape having an outside dimension of 17.5 mm, an inside diameter of 10.2 mm and a height of 5.0 mm in the same manner as in Example 1. Further, heat treatment after the material is molded is performed at 750° C. for 30 minutes in a nitrogen atmosphere.

Next, each of these Examples and Comparative Examples is evaluated for magnetic characteristics and mechanical characteristics. As the magnetic characteristics, the effective magnetic permeability μ at 100 kHz and 4000 A/m and the core loss at 100 kHz and 100 mT are measured. In Example 2, the same measuring conditions as in Example 1 are used except for the above conditions.

TABLE 3

Resins of Examples and Comparative Examples

| Example No., Comparative Example No. | Type of insulating resin | Amount (wt %) | Amount of a phenyl group (mol %) | Amount of T (mol %) |
|---|---|---|---|---|
| Example 2-1 | Methyl-phenyl silicone | 2.4 | 17.3 | 65.1 |
| Example 2-2 | Methyl-phenyl silicone | 2.4 | 17.2 | 56.6 |
| Example 2-3 | Methyl-phenyl silicone | 2.4 | 32.7 | 34.1 |
| Example 2-4 | Methyl-phenyl silicone | 2.4 | 58.1 | 66.5 |
| Example 2-5 | Methyl-phenyl silicone | 2.4 | 55.2 | 32.7 |
| Comparative Example 2-1 | Methyl silicone | 2.4 | 0.0 | 65.1 |
| Comparative Example 2-2 | Methyl-phenyl silicone | 2.4 | 47.2 | 0.0 |

After the molding is finished, the magnetic characteristics and the mechanical characteristics are evaluated in the same manner as in Example 1.

TABLE 4

Magnetic characteristics and mechanical characteristics of Examples and Comparative Examples

| Example No., Comparative | Magnetic characteristics: Effective magnetic permeability μ | Core loss ($kW/m^3$): Pc | Ph | Pe | Mechanical characteristics Radial crushing strengths (MPa) |
|---|---|---|---|---|---|
| Example 2-1 | 41 | 769 | 311 | 458 | 40.9 |
| Example 2—2 | 41 | 773 | 310 | 463 | 40.1 |
| Example 2-3 | 42 | 815 | 321 | 494 | 43.5 |
| Example 2-4 | 43 | 796 | 318 | 478 | 41.9 |
| Example 2-5 | 41 | 758 | 296 | 460 | 45.8 |
| Comparative Example 2-1 | 40 | 1380 | 421 | 959 | 22.5 |
| Comparative Example 2—2 | 41 | 1150 | 398 | 752 | 13.4 |

As to the magnetic characteristics in Table 4, each of Comparative Example 2-1 using a methyl silicone resin and Comparative Example 2-2 using a methyl-phenyl silicone resin containing no trifunctionality T shows a core loss (Pc) as very high as 1150 $kW/m^3$ or more though a large difference in effective magnetic permeability is not observed between Comparative Examples and Example 2-1 or the like using the methyl-phenyl silicone resin according to the present invention. From this result, it is found that insulation between the Sendust powders is reduced because the eddy-current loss (Pe) among the core loss is very large.

As to the mechanical characteristics, the radial crushing strength of each of Examples 2-1 to 2-5 is 40.1 MPa or more whereas the radial crushing strengths of Comparative Examples 2-1 and 2-2 are as very low as 22.5 MPa and 13.4 MPa respectively. This shows that in Comparative Examples 2-1 and 2-2, the silicone resin is decomposed and reduced in amount by heat treatment at a temperature as high as 750° C. and does not function as a binder between Sendust powders. On the contrary, Examples 2-1 to 2-5 exhibit a very high radial crushing strength. This shows that the resin firmly combines the Sendust powders with each other and therefore functions as a binder, exhibiting high thermal stability.

Therefore, it is understood that the methyl silicone resin used in Comparative Example 2-1 and the methyl-phenyl silicone resin which contains no trifunctionality T and is used in Comparative Example 2-2 have less thermal stability similarly to Example 1.

What is claimed is:

1. A method of producing a dust core comprising mixing a ferromagnetic powder with an insulating material, drying the resulting mixture, pulverizing the dried mixture, combining a lubricant with the dried, pulverized mixture, pressure molding the resulting combination to form a molded core; and heat treating the molded core at a temperature in the range of about 300 to about 800° C. for a time period in the range of about 20 minutes to about 2 hours in a non-oxidizing atmosphere;

the insulating material comprising a trifunctional methyl-phenyl silicone resin having a phenyl content in the range of about 15 mol % to about 60 mol %, based on all organic groups in the silicone resin, wherein the methyl-phenyl silicone resin comprises about 20 mol % to about 70 mol % of trifunctional silicone structural units, based on total moles of methyl-phenyl silicone resin, and the amount of methyl-phenyl silicone resin in the dust core being in the range of about 0.5 to about 3% by weight, based on the weight of ferromagnetic powder.

2. The method of claim 1 wherein the lubricant is a fatty acid metal salt.

3. The method of claim 1 wherein the insulating material further comprises an inorganic insulator.

4. The method of claim 3 wherein the inorganic insulator is selected from the group consisting of an inorganic oxide, an inorganic carbide, and an inorganic nitride.

5. The method of claim 1, wherein the molded core is heat treated at a temperature of not more than about 600° C.

* * * * *

UNITED STATES PATENT AND TRADEMARK OFFICE

CERTIFICATE OF CORRECTION

PATENT NO. : 7,235,208 B2
APPLICATION NO. : 11/043397
DATED : June 26, 2007
INVENTOR(S) : Hideharu Moro It is certified that error appears in the above-identified patent and that said Letters Patent is hereby corrected as shown below:

On the title page item (73), should read
-- (73) Assignee: TDK Corporation
Tokyo (JP) --

Signed and Sealed this

Eighteenth Day of December, 2007

JON W. DUDAS
*Director of the United States Patent and Trademark Office*